United States Patent Office 3,173,759
Patented Mar. 16, 1965

3,173,759
LEAD (IV) ZEOLITES
Harry D. Williams, Golfview Park, Penns Grove, N.J., assignor to E. I. du Pont de Nemours and Company, Wilmington, Del., a corporation of Delaware
No Drawing. Filed Mar. 5, 1962, Ser. No. 177,239
6 Claims. (Cl. 23—112)

The present invention relates to a new oxidizing agent, and, more particularly, to a lead oxidizing agent adapted for selective oxidations.

Oxidation processes are widely used in commercial manufacture of many useful chemicals. In general, little difficulty exists in the preparation of fully oxidized compositions, but the preparation of compounds in an intermediate state of oxidation requires the use of expensive reagents and/or time consuming process steps so that only products of high intrinsic value are thus prepared commercially.

Lead tetraacetate is frequently employed in the selective oxidation of organic compounds where less than complete oxidation is required, such as, for example, the cleavage of glycols. While acceptable results are obtained, the process steps required to recover the reduced lead tetraacetate represent a severe economic penalty.

I have now found that an improved lead oxidizing agent comprises a lead zeolite wherein at least a portion of the lead is in a valence state higher than 2. Generally, most of the lead is in the quadrivalent state. This composition has essentially the same oxidizing characteristics as lead tetraacetate with the highly advantageous feature that both in the oxidized and the fully reduced state the present composition is a solid and can readily be separated from a reaction mixture and regenerated for reuse without loss of lead and without requiring expensive and time-consuming process steps. Further, the oxidizing agent of this invention can be used in many reactions in which lead tetraacetate cannot be used, as will be more fully described.

The composition of this invention is prepared by contacting a zeolite with a lead salt solution, said lead in said solution being in the divalent state, removing the excess liquid, subjecting the reaction product to the action of an oxidizing agent for a time sufficient to permit the reaction product to turn to a dark brown color, while insuring that the pH of the solution is greater than 7, and removing said oxidizing agent. In the system of nomenclature used herein the Roman numerals following the metal name show the valence of the metal. For example, lead (II) indicates that the lead has a valence of II.

Zeolites meet the requirements for serving in combination with lead as an oxidizing agent. They have an affinity for lead so that water will not remove the lead by leaching it from the zeolite under neutral conditions. Zeolites are stable under a variety of conditions including both acidic and basic conditions. They are stable at elevated temperatures, at least 200° C., without excessive decomposition.

By zeolite are meant a group of minerals having a continuous framework of linked tetrahedral groupings about silicon and aluminum atoms, similar to the feldspar network, but having a more open structure, and containing water. The negative charge of the framework is balanced by positive ions in the cavities, which positive ions can be replaced by other ions. The zeolites are hydrous sodium, calcium, aluminum silicates that commonly occur as secondary minerals in cavities of subsilicic volcanic rocks, especially basalts. Although variable in optical properties, they all have low indices of refraction and rather weak birefringence.

The natural zeolites, for examples, are materials having the following empirical formulas: $NaAlSi_2O_6 \cdot H_2O$, $Na_2(Al_2Si_3O_{10}) \cdot 2H_2O$, $NaCa_2(Al_5Si_5O_{20}) \cdot 6H_2O$
$Ba(Al_2Si_3O_{10}) \cdot 4H_2O$, $CaNa_2Al_2Si_6O_{16} \cdot 5H_2O$
$CaNa_2Al_2Si_9O_{22} \cdot 6H_2O$, $CaNa_2Al_2Si_6O_{16} \cdot 5H_2O$
$SrBaCaAl_2Si_6O_{16} \cdot 5H_2O$, $BaCaK_2Al_2Si_3O_{10} \cdot 3H_2O$
$K_2CaAl_2Si_4O_{12} \cdot 4\frac{1}{2}H_2O$, $CaNa_2Al_2Si_4O_{12} \cdot 6H_2O$ $Na_2CaAl_2Si_4O_{12} \cdot 6H_2O$ and $CaAl_2Si_3O_{10} \cdot 5H_2O$ and many others. In addition to the natural zeolites, synthetic zeolites can be made by the reaction of sodium silicate solutions with various aluminum salts. By this method zeolites can be made to vary in capacity for inorganic ions and in stability. Natural zeolites can also be modified with solutions of sodium silicate and aluminum salts to vary their stability.

All zeolites are suitable in the practice of the present invention but the class of zeolites known as lamellar zeolites which includes mordenite, phillipsite, heulandite and stilbite as well as others constitute the preferred modifications. These zeolites are known as lamellar zeolites because they exhibit lamellar cleavage parallel to the (010) plane.

The lead is deposited on the zeolite by soaking the sample of zeolite in an aqueous solution of a soluble lead salt wherein the lead is in the divalent state. Suitable lead salts include the acetate and formate. Lead nitrate or lead dithionate can be used providing that the pH of the lead solution is adjusted to not less than 4.0 before it is allowed to contact the zeolite.

The concentration of the lead salt solution is not critical. Saturated solutions are usable as well as solutions containing as little as 0.5% lead. Naturally the solution used will be as concentrated as possible to reduce the size of the reaction vessel used. Saturated solutions constitute the preferred modification. After filtering off the excess liquid the lead deposited on the zeolite is oxidized to a higher state by means of a suitable oxidizing agent. Suitable oxidizing agents include sodium hypochlorite, chlorine, ozone, hydrogen peroxide, air, oxygen and mixtures of the foregoing.

During the oxidation the pH of the system must be higher than seven. The first four of the above oxidizing agents oxidize lead quickly at temperatures above 10° C. In order to use air, oxygen or mixtures thereof temperatures as high as 200° C. or higher can be used for shortening the oxidation time. The oxidation of lead (II) zeolite is characterized by a change in color from light tan to a dark brown color characteristic of lead (IV) zeolite. On reduction to lead (II) the original light tan color is obtained. This change of valence state can be accomplished for many cycles without loss of lead. Therefore, regeneration of the oxidized state of the lead-on-zeolite can be accomplished in the same manner as described above.

For maximum efficiency the amount of oxidizing agent used must be at least the stoichiometric quantity to oxidize all of the lead (II) to lead (IV). Any larger quantity can be used and recovered for reuse by filtration or other suitable conventional means.

The amount of lead reacted with the zeolite will vary with the particular zeolite used and its capacity for accepting ions. In general, the number of milliequivalents of lead deposited on the zeolite will vary from about 0.5 per gram of zeolite to about 3.0 or higher per gram of zeolite. The equivalent weight of lead to be used is one half its atomic weight. The greater the capacity of the zeolite for lead the more advantageous because of the corresponding reduction of the amount of zeolite necessary to obtain a given amount of oxidation.

The invention is demonstrated by means of the following examples. Parts where given are by weight.

Example 1

A solution of lead diacetate is prepared containing 5% $Pb(C_2H_3O_2)_2$. A synthetic mordenite (100 grams) is soaked in the lead diacetate (1000 ml.) solution for 10 minutes and the solid filtered off and washed twice with 100 ml. portions of water. The solid reaction product is, of course, a very light tan in color. It is placed in a solution of 5% sodium hypochlorite (500 parts). The solid quickly becomes a dark brown in color. It is filtered off and dried. The procedure is repeated for three additional samples of mordenite. The analyses of the mordenite and the oxidized lead mordenite are shown in the following table. The oxidizing power of the lead mordenite is determined by adding a known sample of it to an excess of standard ferrous sulfate, agitating the slurry for a few minutes, filtering off the solid, and titrating the filtrate with standard ceric sulfate. After reduction the lead (II) mordenite is light tan but can be reoxidized with 5% NaOCl to give the characteristic dark brown of oxidized lead mordenite thus indicating that the lead mordenite can be reused.

| Sample | A | B | C | D |
| --- | --- | --- | --- | --- |
| ANALYSES OF STARTING MORDENITE | | | | |
| $SiO_2$ | 72.73 | 77.34 | 70.29 | 74.57 |
| $Al_2O_3$ | 10.95 | 11.09 | 13.32 | 13.51 |
| $Fe_2O_3$ | 0.92 | 0.97 | 0.84 | 0.61 |
| $TiO_2$ | 0.04 | 0.04 | 0.08 | 0.05 |
| CaO | 0.15 | 0.03 | 0.60 | 0.64 |
| MgO | 0.20 |  | 0.17 | 0.13 |
| $Na_2O$ | 6.06 | 0.08 | 4.27 | 0.19 |
| $K_2O$ | 0.00 | 0.00 | 3.43 | 2.20 |
| $H_2O$ | 8.88 | 8.43 | 6.68 | 7.68 |
| PRODUCT AFTER REACTING THE MORDENITE WITH LEAD DIACETATE AND OXIDIZING | | | | |
| Percent Lead | 20.2 |  |  |  |
| Milliequivalents lead per gram of mordenite | 1.91 | 1.46 | 1.11 | 1.07 |

An X-ray diffraction pattern of sample A (dry oxidized lead mordenite) does not resemble that of any known compound and, more particularly, does not resemble the pattern of lead dioxide or lead silicate, thus indicating that a new composition of matter is obtained.

The procedure above is also repeated using chabazite, heulandite and natrolite as the zeolite material with similar results.

Example 2

Benzopinacol (1.3 parts) is slurried in benzene as reaction medium (150 parts) with an oxidized lead-on-mordenite (30 parts) prepared as in Example 1. The slurry is brought to reflux temperature and 16 parts of ethanol is added. The slurry is then refluxed for 3 hours, cooled and the solid filtered off and washed with benzene. The filtrate is treated with an ethanolic solution of 2,4-dinitrophenylhydrazine. A solid separates which is washed with 100 ml. of hot ethanol and dried. The product amounts to 1.44 parts, or a yield of 56.5%, of the 2,4-dinitrophenylhydrazone of benzophenone. The product has an infrared spectrum identical to that of authentic material.

This oxidation demonstrates the ability of the lead (IV) zeolite to oxidize a glycol.

The used lead mordenite is a light tan in color. When treated with 5% aqueous NaOCl it turns a dark brown indicating a regeneration to the lead (IV) valence state.

Example 3

Cyclohexene (15 parts) is added to 1000 parts of glacial acetic acid with 500 parts of oxidized lead-on-mordenite prepared as described in Example 1 and slurried at 50–55° C. for 3 hours. The slurry is cooled, the solid filtered off and washed with 100 parts of glacial acetic acid. The acetic acid is removed from the filtrate by distillation at reduced pressure. Infrared spectroscopy shows that the liquid residue contains 1-hydroxy-2-acetoxycyclohexane. The initial oxidation product, 1,2-dihydroxycyclohexane, has been partially esterified with the glacial acetic acid during the oxidation. Again, the recovered lead mordenite is light tan in color and turns dark brown on treatment with 30% hydrogen peroxide at a pH of 10.

This oxidation demonstrates the ability of the lead (IV) mordenite to oxidize a —C=C— double bond.

Example 4

Oxidized lead mordenite prepared as in Example 1 (40 parts) is slurried in 100 parts of methyl chloroacetate for three hours at reflux temperature of 131° C. The lead is reduced as evidenced by a change in color from dark brown to light tan. The solid is filtered off. The excess methyl chloroacetate in the filtrate is removed by distillation at reduced pressure and a fraction is collected boiling at 60–65° C. at 1 millimeter pressure. This fraction is passed through a vapor phase chromatographic column consisting of 2 feet of silicone rubber on celite at 122° C. Three components are separated by this means which are identified by their infrared spectra as monochloroacetic acid, a chloropropionate ester, and dimethyl monochlorosuccinate, a dibasic acid ester. The presence of the last compound indicates that bimolecular coupling has occurred followed by chlorination of the coupled product by the chlorine formed during the oxidation.

This example demonstrates the ability of the lead (IV) mordenite to oxidatively couple organic chlorine compounds.

Example 5

Chloroacetic acid (67.3 parts) oxidized lead mordenite prepared as in Example 1 (750 parts) and diphenylmethane (150 parts) are heated at reflux for 3 hours. The slurry is then cooled, diluted with 1500 parts of ether and extracted with 2–100 part portions of 10% aqueous NaOH. The extract contains chloroacetic acid and diphenylmethane. The residual solution is distilled at reduced pressure to remove excess diphenylmethane. The residue is mixed with 500 parts of ether and the solids are filtered off. Vapor phase chromatography shows that these solids are a mixture of anthraquinone and a high molecular weight hydrocarbon. While we do not wish to be bound by theory the following reaction has probably occurred.

(1)

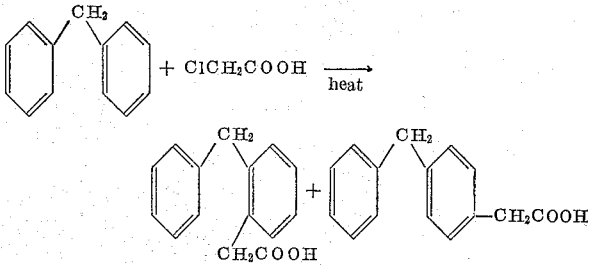

(2)

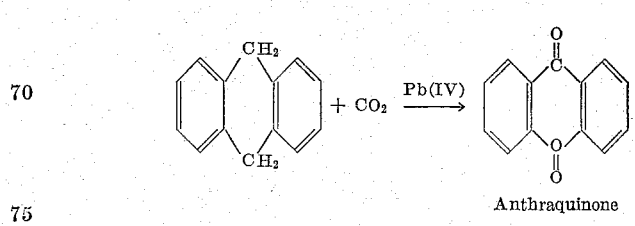

Anthraquinone (3) 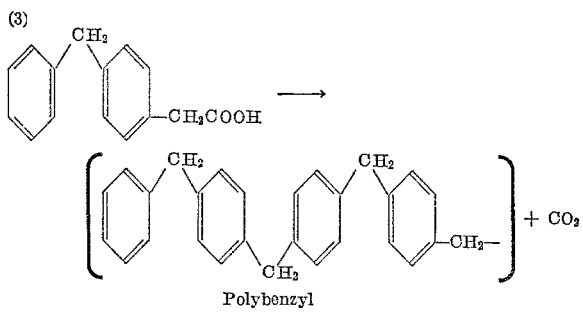

Polybenzyl

This oxidation shows the ability of the lead (IV) mordenite to oxidize —$CH_2$— groups.

*Example 6*

A sample of oxidized lead mordenite (20 parts) preparred as in Example 1 is placed in 100 parts of 37% aqueous HCl at room temperature. Gas evolution begins. The gas evolved turns KI-starch paper a dark purple immediately. A sample of the collected gas is shown to be chlorine by mass spectroscopy. The lead mordenite becomes a light tan during the reaction indicating that as chlorine is formed the lead is reduced.

Chlorine is also evolved when oxidized lead mordenite is placed in aqueous 5% HCl at a temperature of 120° C. Chlorine is also evolved when a mixture of gaseous HCl and water vapor (80:20 by volume) is passed through a tube containing a sample of oxidized lead mordenite heated at 200° C. The number of equivalents of chlorine given off corresponds to the number of equivalents of oxidized lead on the mordenite.

This oxidation shows the ability of the lead (IV) mordenite to oxidize HCl to chlorine.

Several embodiments of the invention are fully described above. Many other modifications are possible without departing from the invention concept.

What is claimed is:
1. A lead zeolite wherein lead is in the valence state of four.
2. The lead zeolite of claim 1 wherein the zeolite is selected from the group consisting of natural and synthetic mordenites.
3. The lead zeolite of claim 1 wherein the zeolite is a lamellar zeolite.
4. A process for preparing lead zeolite wherein lead is in a valence state of four which comprises contacting a zeolite with a lead salt solution, said lead in said solution being in the divalent state, removing the excess liquid, subjecting the reaction product to the action of an oxidizing agent for a time sufficient to permit the reaction product to turn to a dark brown color, while insuring that the pH of the solution is greater than 7, and removing said oxidizing agent.
5. The process of claim 4 wherein the oxidizing agent is selected from the group consisting of ozone, sodium hypochlorite, chlorine, hydrogen peroxide, air, and oxygen.
6. A process for the manufacture of chlorine wherein a mixture of hydrogen chloride and $H_2O$ containing at least 5 percent hydrogen chloride is treated with lead zeolite wherein lead is in a valence state of four at a temperature of from about room temperature to about 200° C. and recovering elemental chlorine from the mixture.

References Cited in the file of this patent
UNITED STATES PATENTS

| | | |
|---|---|---|
| 1,050,204 | Boethringer et al. | Jan. 14, 1913 |
| 1,304,206 | Rudorf | May 20, 1919 |
| 3,013,982 | Breck et al. | Dec. 19, 1961 |

OTHER REFERENCES

J. W. Mellor's "A Comprehensive Treatise on Inorganic and Theoretical Chemistry," vol. 6, page 578, (1925 edition), and vol. 7, (1927 edition), pages 669 and 673, Longmans, Green & Co., N.Y.